United States Patent Office 3,432,693
Patented Mar. 11, 1969

3,432,693
PROCESS AND APPARATUS FOR OVEROXIDISING THE AIR SUPPLIED TO THE BLOWPIPE OF A MAGNETOHYDRODYNAMIC CONVERSION PLANT
Jean Fabre and Jacques F. Millet, Paris, France, assignors to Electricite De France Service National, Paris, France, a company of France
Filed Jan. 17, 1967, Ser. No. 609,800
Claims priority, application France, Feb. 10, 1966, 49,114; June 30, 1966, 67,696
U.S. Cl. 310—11          7 Claims
Int. Cl. H02k 45/00; G21d 7/02

ABSTRACT OF THE DISCLOSURE

The present invention relates to a process and apparatus for supplying air previously overoxidised to a blowpipe of a magnetohydrodynamic conversion plant directly transforming thermal energy into electrical energy, the oxygen for enriching the feed air emanating from the decomposition at elevated temperature of metal oxides of polyvalent metals accompanied by the formation of lower oxides which are reoxdised by the oxygen in the surrounding air in order to re-supply the air fed to the blowpipe with enriching oxygen.

---

Figure 1:
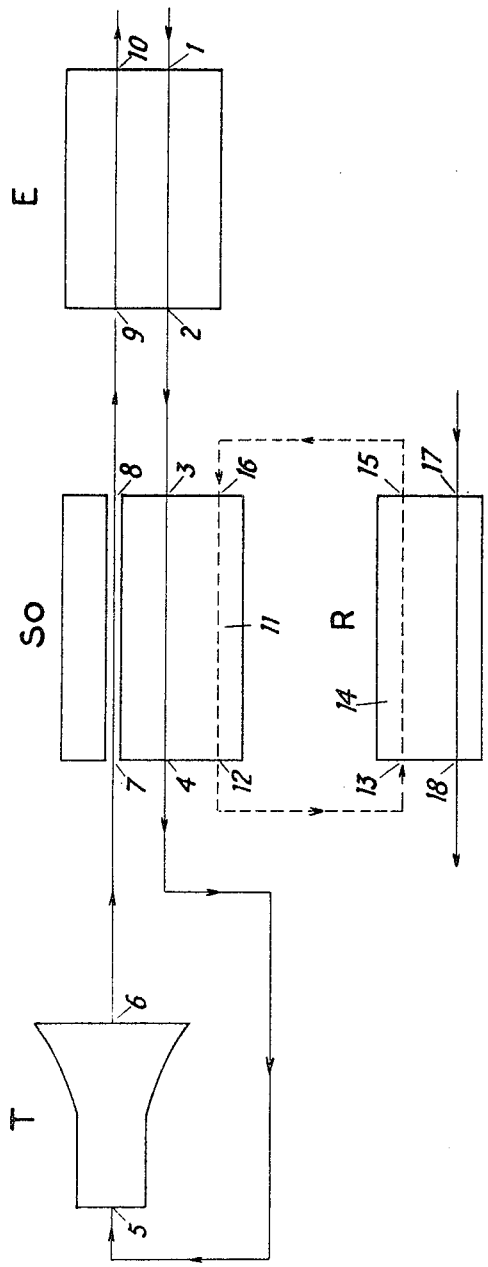

This invention relates to a process and apparatus for overoxidising the air supplied to the blowpipe of a magnetohydrodynamic conversion plant.

Magnetohydrodynamic conversion is the direct transformation of thermal energy into electrical energy by means of an ionised gas circulating at high speed and at elevated temperature in a magnetic field.

The theoretical yield of magnetohydrodynamic conversion plant is increased when the temperature of the gas stream flowing through it is increased, an extremely high temperature being required if the gas is to have sufficient electric conductivity for the plant to supply a useful output of electricity.

The hot gases circulating in a magnetohydrodynamic conversion plant emanate from the combustion in a blow pipe of an inflammable gas and a supporter of combustion producing a flame at an extremely high temperature. The temperature of these gases can be increased by using air enriched with oxygen as the supporter of combustion.

The problem which then arises is the need for a permanent supply of enriching oxygen which is as economical as possible.

In the present invention, the air supplied to a magnetohydrodynamic conversion plant is enriched with oxygen by the decomposition at elevated temperature of an oxide of a polyvalent metal, the resulting lower oxide of this metal being re-oxidised at a lower temperature by the oxygen from the surrounding air, so that it can be used for another oxidation cycle. Since the reaction in which the oxides are decomposed is endothermic, the heat required is supplied according to the invention by the gases issuing from the blowpipe of the plant.

The process of the invention may be applied in different forms. In a first embodiment of this process, the feed air is heated prior to its introduction into the blowpipe by heat exchange with the gases emanating from combustion in the blowpipe, and reaches a temperature equal to or higher than 1000° C. upon contact with higher metal oxides which decompose to form lower oxides, accompanied by the evolution of oxygen. These lower oxides are then re-oxidised by being brought into contact with a stream of air at a lower temperature. Accordingly, the feed air is enriched with oxygen at intervals, which necessitates the presence of at least two oxidation circuits operating in alternation.

In another embodiment of the process according to the invention, the feed air is enriched in a continuous cycle. In this case, the oxygen is supplied by a metal oxide into which oxygen can migrate, a temperature gradient producing an evolution of oxygen on one of the faces of the oxide mass by decomposition of the higher oxides at elevated temperature, and at the same time regeneration of the lower oxide on another face of the oxide mass, by absorbing oxygen from the air at a lower temperature, to compensate the stoichiometric imbalance prevailing in the oxide mass.

Some examples of oxide systems particularly suitable for the process according to the invention will now be discussed by way of example.

The oxides preferably used for the process of the invention in its non-continuous form, that is to say with decomposition of the higher oxide and regeneration of the lower oxide in separate phases, should be present as solids in the two higher and lower forms. Moreover, these oxides should have a high oxygen content and should decompose at temperatures near to or higher than 1000° C. The oxides are used in powder form so as to have a large specific surface. Oxides such as the oxides of iron or of manganese which are obtained in almost their native states after some physical separation processes, are particularly suitable for use in the process according to the invention.

Example 1.—The oxides of tin

There are two oxides, $SnO_2$ and $SnO$, the first of which decomposes above 1130° C. to give the second.

$$SnO_2 \rightleftharpoons SnO + 0.5O_2$$

It is known that the composition which is stable between 750 and 1000° C. corresponds to $SnO$. 16 g. of oxygen are exchanged for 135 g. of oxide.

Example 2.—The oxides of iron

There are three oxides of iron, the protoxide $FeO$, the saline oxide $Fe_3O_4$ and the sesquioxide $Fe_2O_3$.

The equilibrium $3Fe_2O_3 \rightleftharpoons 2Fe_3O_4 + 0.5O_2$ corresponds to an exchange of 16 g. of oxygen for 464 g. of oxide at a temperature of around 1350° C.

Example 3.—The oxides of manganese

The most highly oxidised forms decompose between 480 and 680° C. The decomposition reaction takes place between 850° C. and 1000° The reaction $$3Mn_2O_3 \rightleftharpoons 2Mn_3O_4 + 0.5O_2$$

corresponds to an exchange of 16 g. of oxygen for 372 g. of oxide.

In cases where the process of the invention is carried out in a continuous cycle, the higher metal oxide acting as oxygen donor is with advantage arranged in the form of a tube in which circulates the feed air heated beforehand by heat exchange with the gases issuing from the blowpipe, the tube itself being surrounded by air at a lower temperature.

In the case of iron oxides, for example, it is known that between 1350 and 1450° C., the composition of the oxide at equilibrium is midway between $Fe_2O_3$ and $Fe_3O_4$. At 1350° C., the oxygen pressure at equilibrium is 0.1 atmosphere and, at 1450° C., 1 atmosphere.

By circulating the air supplied to an M.H.D. blowpipe within a tube of iron oxide obtained for example by the partial fusion of sesquioxide or magnetite, or even by fusing one of the two oxides and reheating it to the operating temperature, the air circulating in this tube having been heated beforehand to 1450° C., for example after heat exchange with the combustion gases issuing from the blowpipe, the tube itself being surrounded by air at a temperature of 1350° C., it is possible to obtain an evolution of enriching oxygen on the inner surface of the tube wall. The stoichiometric imbalance which then prevails inside the wall of the tube results in the absorption of oxygen from the air surrounding the tube on the outer surface of the tube wall.

The mechanism by which the oxygen is diffused through the wall of the oxide tube, may function either by displacement in the atomic state or by displacement in the ionic state.

In the particular case of the diffusion of the oxygen through the wall of the tube in the ionic state, a conductive substance with anion vacancies is present, and the electrochemical reactions which take place on the two walls of the tube are as follows:

On the outer surface of the tube wall, the absorption of molecular oxygen from air which is ionised:

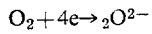

On the inner surface, the evolution of enriching oxygen in molecular form:

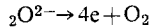

The displacement of oxygen in the form of anions from the outer surface to the inner surface of the tube wall, involves an inverse displacement of electrons and accordingly presupposes that the oxide used is conductive both to ions and to electrons. This system functions on the lines of a short-circuit concentration cell.

To carry out the process according to the invention, it is of advantage to use a zirconium tube which is conductive both to ions and to electrons and which can be obtained for example by partial fusion of zirconium oxide containing 10% of magnesia.

Figure 2:
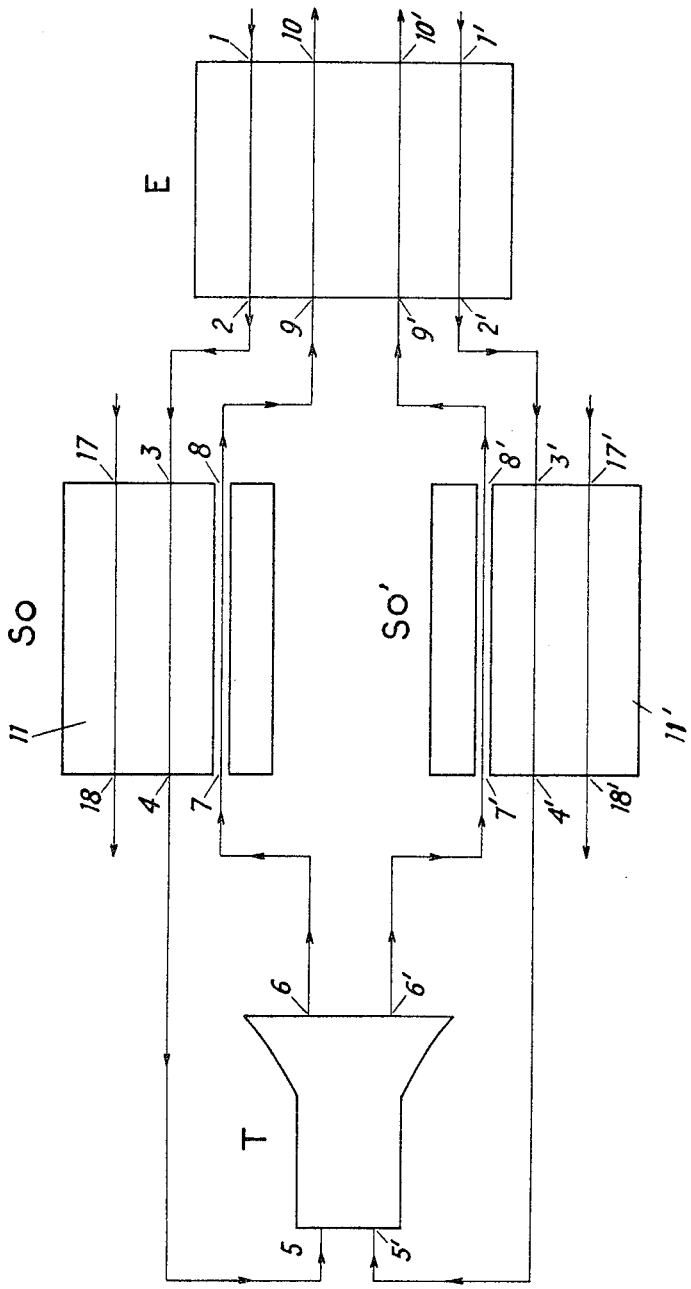

The process and apparatus of the invention will be better understood from the accompanying drawings in which:

FIG. 1 diagrammatically illustrates one embodiment of the apparatus according to the invention, and FIG. 2 diagrammatically illustrates a second embodiment of the apparatus according to the invention.

FIG. 1 shows diagrammatically an apparatus for carrying out the process according to the invention by decomposition of the higher oxide and regeneration of the lower oxide in separate chambers, which means that the oxides have to circulate from one chamber to the other and vice versa.

The magnetohydrodynamic conversion plant comprises a blowpipe T supplied on the one hand with inflammable gas from a circuit which has not been shown in the drawings, and on the other hand with overoxidised air. The feed air flows through a low-temperature exchanger E and a high-temperature overoxidising exchanger SO. A chamber R is also provided for regenerating the lower oxides into higher oxides.

The combustion gases issuing at 6 from the blowpipe T flow through the overoxidising exchanger SO into a sealed circuit extending from 7 to 8. The supply air enters the overoxidation chamber 11 containing the higher oxides (not shown) at 3 and leaves it at 4.

The combustion gases issuing from the overoxidising exchanger SO at 8 enter the low-temperature exchanger E at 9 and leave it at 10.

The supply air enters the exchanger E at 1 and leaves it at 2.

Following decomposition into lower oxides, the higher oxides are removed from the overoxidation chamber 11 at 12 and, at 13, enter the regeneration chamber R through which flows a stream of low-temperature air entering at 17 and leaving at 18.

The regenerated oxides leave the enclosure R at 15 and return to the overoxidation chamber 11. The supply air is thus preheated in the low-temperature exchanger E and then overoxidised at elevated temperature in the overoxidation chamber 11 of the overoxidising exchanger SO, and thus enriched feeds the blowpipe T at 5.

The lower oxides 14 are regenerated in the regeneration chamber R by contact with the stream of low temperature air 17–18.

The spent oxides may be carried from 12 to 13 by gravity. The regenerated oxides may be returned from 15 to 16 by means of an endless screw or rollers chain.

FIGURE 2 diagrammatically illustrates an apparatus for carrying out the process according to the invention, comprising two overoxidising exchangers SO and SO' functioning in alternation according to an enrichment phase and a regeneration phase. This apparatus does not comprise a separate chamber for regenerating the lower oxides into higher oxides. Instead, regeneration takes place inside the overoxidation chambers by passing through them a stream of low-temperature air which comes into contact with the lower oxides which are thus reoxidised in situ.

Accordingly, the apparatus shown in FIGURE 2 comprises a blowpipe T, two overoxidising exchangers SO and SO' and a single low-temperature exchanger E.

The overoxidising exchangers SO and SO' are traversed during the enrichment phase by the combustion gases issuing from the blowpipe T either at 6 or 6' and by the feed air flowing from 3 to 4 and from 3' to 4', respectively, and during the regeneration phase, by a stream of low-temperature air flowing from 17 to 18 and from 17' to 18' respectively.

The oxides are accommodated in the overoxidation chambers 11 and 11'.

The low-temperature exchanger E comprises two circuits 9–10 and 9'–10' for the combustion gases issuing from the overoxidising exchangers SO and SO', and two circuits 1–2 and 1'–2' for the supply air.

When the overoxidising exchanger SO is in the enrichment phase, the overoxidising exchanger SO' is in the regeneration phase.

In a first stage, the supply air follows the circuit 1–2 in the exchanger E where it is preheated, and then the circuit 3–4 in the overoxidising exchanger SO in the enrichment phase where it is enriched by the oxygen emanating from the decomposition of the higher oxides in the overoxidation chamber 11 heated to elevated temperature by the sealed circulation 7–8 of the combustion gases issuing at 6 from the blowpipe T. The air thus overoxidised feeds the blowpipe T at 5.

During this same period, the exchanger SO' in the regeneration phase receives the stream of air 17'–18' which comes into contact with the oxides previously exhausted in the overoxidation chamber 11', so that they are reoxidised in situ.

In a second stage, supply air follows the circuit 1'–2'–3'–4'–5', whilst the combustion gases follow the circuit 6'–7'–8'–9'–10', the overoxidising exchanger SO being in the enrichment phase.

During this period, the stream of air 17–18 flows through the overoxidising exchanger SO in the regeneration phase and comes into contact with the oxides previously exhausted in the overoxidation chamber 11, so that they are re-oxidised in situ.

The apparatus used to carry out the process for overoxidising the supply air in a continuous cycle, are extremely simple. The supply air heated beforehand to a temperature around 1450° C. in a heat exchanger in which circulate the gases issuing from the blowpipe, flows through the inside of the tube made of a suitable oxide through which oxygen is able to migrate. This tube is with advantage made from zirconium conductive both to ions and to electrons, for example by partial fusion of zirconium oxide containing 10% of magnesia. This tube is surrounded by air at a temperature of around 1350° C. The supply air which circulates inside the tube enriched with oxygen, feeds the blowpipe of the magnetohydrodynamic conversion plant. The stoichiometric imbalance prevailing inside the wall of the oxide tube, results in the absorption of oxygen from the surrounding air on the outer wall of the tube. Accordingly, the overoxidation of the air supplying the magnetohydrodynamic blowpipe takes place continuously.

We claim:
1. A process for supplying air to the blowpipe of a magnetohydrodynamic conversion plant transforming the thermal energy carried by gases at elevated temperature emanating from combustion in said blowpipe, directly into electrical energy, comprising the steps of:
  (a) preheating the supply air for combustion by heat exchange with the gases issuing from the blowpipe to a temperature substantially between 1000 and 1500° C.;
  (b) enriching this supply air with oxygen by circulation in contact with oxides of polyvalent metals which exist as solids at temperatures in the range from about 400 to 1500° C. in the form of at least one higher oxide and at least one lower oxide, these oxides decomposing into oxygen and lower oxide at the temperature to which they supply air is preheated; and
  (c) regenerating the lower oxides emanating from said decomposition by reoxidising them into higher oxide by circulation of a stream of air at a lower temperature.

2. The process of claim 1, in which said oxides are oxides of metals belonging to the group including iron, tin, manganese and zirconium.

3. The process of claim 1, in which said regeneration phase for said lower oxides is a separate phase which follows the phase in which the feed air is enriched by decomposition of said higher oxides.

4. A process for supplying air to the blowpipe of a magnetohydrodynamic conversion plant which directly transforms the thermal energy carried by gases heated to an extremely high temperature as a result of combustion in said blowpipe, into electrical energy, comprising the steps of:
  (a) preheating the supply air for combustion by heat exchange with the gases issuing from said blowpipe to a temperature substantially between 1000 and 1500° C.; and
  (b) enriching said supply air with oxygen by circulating it in a tube consisting of a metal oxide through which oxygen is able to migrate, said tube being externally surrounded by air at a temperature lower than that of the feed air, the effect of which is to promote decomposition of the oxide, accompanied by the liberation of oxygen inside the tube, and at the same time regeneration by the absorption of oxygen from the air outside the tube to compensate the stoichiometric imbalance existing in the wall of the tube.

5. The process of claim 4, in which a zirconium tube is used obtained by partial fusion of a zirconium oxide containing approximately 10% of magnesia.

6. An apparatus for overoxidising the air supplied to a magnetohydrodynamic conversion blowpipe directly transforming the thermal energy carried by gases heated to an extremely high temperature as a result of combustion in said blowpipe, into electrical energy, comprising at least one high-temperature overoxidising exchanger which is placed in the circuit followed by the said supply air and through which pass said combustion gases issuing from said blowpipe, said overoxidising exchanger comprising a sealed circuit for said combustion gases and a chamber receiving the metal oxides of polyvalent metals capable of decomposing with evolution of oxygen, and of regenerating by the absorption of oxygen from the surrounding air, said overoxidising exchanger being traversed during an enrichment phase by the combustion gases issuing from said blowpipe and by the preheated air which is enriched with oxygen in said overoxidation chamber to feed said blowpipe and regeneration means for reoxidising the oxides by contact with the surrounding air at a lower temperature.

7. The apparatus of claim 6, wherein the said means for regenerating the oxides comprise a regeneration chamber separated from said overoxidising exchanger, a stream of air flowing through this regeneration chamber, transfer means being provided to remove said oxides decomposed in said overoxidation chamber from said exchanger to said regeneration chamber, and for returning the regenerated oxides to said overoxidising exchanger.

References Cited
UNITED STATES PATENTS 3,264,501   8/1966   Kantrowitz et al. _____ 310—11

DAVID X. SLINEY, *Primary Examiner.*

U.S. Cl. X.R.
60—206; 263—20